(12) United States Patent
Contino et al.

(10) Patent No.: US 9,386,463 B1
(45) Date of Patent: Jul. 5, 2016

(54) APPLICATION RISK ANALYSIS

(71) Applicant: Sprint Communications Company L.P., Overland Park, KS (US)

(72) Inventors: Jeffrey Ronald Contino, Lenexa, KS (US); Jason Salge, Olathe, KS (US); M. Jeffrey Stone, Overland Park, KS (US); Robert L. Waldrop, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 392 days.

(21) Appl. No.: 13/681,337

(22) Filed: Nov. 19, 2012

(51) Int. Cl.
*H04W 24/02* (2009.01)
(52) U.S. Cl.
CPC .................................. *H04W 24/02* (2013.01)
(58) Field of Classification Search
CPC ..... H04W 8/245; H04W 24/02; H04W 88/02; H04M 1/72525; H04M 1/72522
USPC .......................... 455/410, 411, 418
See application file for complete search history.

(56) References Cited

U.S. PATENT DOCUMENTS

| | | | |
|---|---|---|---|
| 6,055,433 A | 4/2000 | Yuan et al. | |
| 6,912,574 B2 | 6/2005 | Scifres et al. | |
| 7,293,201 B2 | 11/2007 | Ansari | |
| 7,693,876 B2 | 4/2010 | Hackworth et al. | |
| 7,797,343 B2 | 9/2010 | Morain et al. | |
| 8,200,206 B2 | 6/2012 | Parmar et al. | |
| 8,406,756 B1 | 3/2013 | Reeves et al. | |
| 8,422,988 B1 | 4/2013 | Keshav | |
| 8,588,764 B1 | 11/2013 | Koller et al. | |
| 8,627,475 B2* | 1/2014 | Loveland et al. | 726/24 |
| 8,644,813 B1 | 2/2014 | Gailloux et al. | |
| 8,763,131 B2* | 6/2014 | Archer et al. | 726/25 |
| 8,782,472 B2 | 7/2014 | Ganesan et al. | |
| 8,909,990 B2 | 12/2014 | Davis et al. | |
| 2002/0072359 A1 | 6/2002 | Moles et al. | |
| 2002/0087950 A1 | 7/2002 | Brodeur et al. | |
| 2002/0165784 A1 | 11/2002 | Taggart et al. | |
| 2003/0027580 A1 | 2/2003 | Goodjohn et al. | |
| 2003/0139905 A1 | 7/2003 | Helsper et al. | |
| 2004/0019807 A1* | 1/2004 | Freund | 713/201 |
| 2004/0203755 A1 | 10/2004 | Brunet et al. | |
| 2004/0218602 A1 | 11/2004 | Hrastar | |
| 2005/0055426 A1 | 3/2005 | Smith et al. | |
| 2005/0107107 A1 | 5/2005 | Shahidi et al. | |

(Continued)

OTHER PUBLICATIONS

Notice of Allowance dated Sep. 30, 2013, U.S. Appl. No. 12/629,860, filed Dec. 2, 2009.

(Continued)

*Primary Examiner* — Nathan Mitchell

(57) ABSTRACT

A method of managing the risk of a monitored application installed on a mobile communication device comprises determining a risk profile of the monitored application based on at least one of: comparison of performance of the mobile communication device before and after installation of the monitored application on the mobile communication device, comparison of permission requests of the monitored application versus a type of the monitored application, community feedback of the monitored application, an amount of time elapsed since release of the monitored application, and a risk profile of a publisher of the monitored application; and performing a first action if the risk profile of the monitored application meets or exceeds a predefined first threshold.

16 Claims, 7 Drawing Sheets

(56) References Cited

U.S. PATENT DOCUMENTS

| | | | |
|---|---|---|---|
| 2005/0114504 A1 | 5/2005 | Marolia et al. | |
| 2005/0262563 A1 | 11/2005 | Mahone et al. | |
| 2006/0223495 A1 | 10/2006 | Cassett et al. | |
| 2006/0233114 A1 | 10/2006 | Alam et al. | |
| 2006/0234698 A1 | 10/2006 | Fok et al. | |
| 2007/0180521 A1 | 8/2007 | Malkin et al. | |
| 2007/0206546 A1 | 9/2007 | Alberth, Jr. et al. | |
| 2007/0207800 A1 | 9/2007 | Daley et al. | |
| 2008/0084993 A1 | 4/2008 | Peddireddy et al. | |
| 2008/0214186 A1 | 9/2008 | Bizzarri et al. | |
| 2008/0274716 A1 | 11/2008 | Fok et al. | |
| 2008/0288946 A1 | 11/2008 | Richards et al. | |
| 2008/0301295 A1 | 12/2008 | Malkin et al. | |
| 2009/0049544 A1 | 2/2009 | Kashi | |
| 2009/0156199 A1 | 6/2009 | Steenstra et al. | |
| 2009/0213871 A1 | 8/2009 | Carlson et al. | |
| 2009/0288144 A1 | 11/2009 | Huber et al. | |
| 2010/0172257 A1* | 7/2010 | Yu | 370/252 |
| 2010/0195503 A1 | 8/2010 | Raleigh | |
| 2010/0197238 A1 | 8/2010 | Pathuri et al. | |
| 2010/0235918 A1 | 9/2010 | Mizrahi et al. | |
| 2010/0281155 A1 | 11/2010 | Cipollone et al. | |
| 2010/0330954 A1 | 12/2010 | Manning Cassett et al. | |
| 2011/0098018 A1 | 4/2011 | Engel | |
| 2011/0161484 A1 | 6/2011 | Van den Bogaert et al. | |
| 2011/0199934 A1 | 8/2011 | Olofsson et al. | |
| 2011/0213865 A1 | 9/2011 | Durazzo et al. | |
| 2011/0280130 A1 | 11/2011 | Foottit et al. | |
| 2011/0320607 A1 | 12/2011 | Harrang et al. | |
| 2012/0072991 A1* | 3/2012 | Belani et al. | 726/25 |
| 2012/0084184 A1 | 4/2012 | Raleigh et al. | |
| 2012/0101952 A1 | 4/2012 | Raleigh et al. | |
| 2012/0102191 A1 | 4/2012 | Rabii | |
| 2012/0108225 A1 | 5/2012 | Luna et al. | |
| 2012/0115433 A1 | 5/2012 | Young et al. | |
| 2012/0117478 A1 | 5/2012 | Vadde et al. | |
| 2012/0129503 A1* | 5/2012 | Lindeman et al. | 455/414.1 |
| 2012/0196543 A1 | 8/2012 | Andersson et al. | |
| 2012/0221955 A1 | 8/2012 | Raleigh et al. | |
| 2012/0240229 A1* | 9/2012 | Sobel et al. | 726/24 |
| 2012/0252357 A1 | 10/2012 | Tarleton et al. | |
| 2012/0317645 A1* | 12/2012 | Fortier | 726/24 |
| 2013/0007245 A1 | 1/2013 | Malik et al. | |
| 2013/0018965 A1 | 1/2013 | Ramachandran et al. | |
| 2013/0023230 A9 | 1/2013 | Momtahan et al. | |
| 2013/0031599 A1 | 1/2013 | Luna et al. | |
| 2013/0036450 A1 | 2/2013 | Kim et al. | |
| 2013/0042294 A1* | 2/2013 | Colvin et al. | 726/1 |
| 2013/0047038 A1 | 2/2013 | Huang | |
| 2013/0055401 A1* | 2/2013 | Kim et al. | 726/25 |
| 2013/0103973 A1 | 4/2013 | Werth et al. | |
| 2013/0262935 A1 | 10/2013 | Kutchuk et al. | |
| 2013/0311836 A1* | 11/2013 | Hurst | G06F 11/0742 714/48 |
| 2014/0113588 A1* | 4/2014 | Chekina et al. | 455/410 |
| 2014/0165203 A1* | 6/2014 | Friedrichs et al. | 726/24 |

OTHER PUBLICATIONS

Koller, Gary D., et al., Patent Application entitled "Wireless Network Edge Guardian," filed Jan. 26, 2012, U.S. Appl. No. 13/359,311.

Sung, Dan, App of the Day—3G Watchdog (Android), http://www.pocket-lint.com/news/103874-data-monitoring-app-for-android, May 26, 2010.

Advisory Action dated Jun. 6, 2013, U.S. Appl. No. 12/629,860, filed Dec. 2, 2009.

FAIPP Pre-Interview Communication dated May 6, 2013, U.S. Appl. No. 13/359,311, filed Jan. 26, 2013.

Notice of Allowance dated Jul. 1, 2013, U.S. Appl. No. 13/359,311, filed Jan. 26, 2012.

Gailloux, Michael A., et al., Patent Application entitled, "Customer Initated Mobile Diagnostics Service" filed Dec. 2, 2009, U.S. Appl. No. 12/629,860.

Contino, Jeff, et al., Patent Application entitled, "Evaluation of Mobile Device State and Performance Metrics for Diagnosis and Troubleshooting of Performance Issues", filed Oct. 18, 2012, U.S. Appl. No. 13/655,333.

Pre-Interview Communication dated Oct. 2, 2012, U.S. Appl. No. 12/629,860, filed Dec. 2, 2009.

FAIPP Office Action dated Dec. 7, 2012, U.S. Appl. No. 12/629,860, filed Dec. 2, 2009.

Final Office Action dated Apr. 9, 2013, U.S. Appl. No. 12/629,860, filed Dec. 2, 2009.

FAIPP Pre-Interview Communication dated Apr. 7, 2015, U.S. Appl. No. 13/655,333, filed Oct. 18, 2012.

Final Office Action dated Nov. 25, 2015, U.S. Appl. No. 13/655,333, filed Oct. 18, 2012.

FAIPP Office Action dated Jul. 22, 2015, U.S. Appl. No. 13/655,333, filed Oct. 18, 2012.

Advisory Action dated Mar. 1, 2016, U.S. Appl. No. 13/655,333, filed on Oct. 18, 2012.

\* cited by examiner

APPLICATION RISK ANALYSIS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are becoming increasingly intertwined with our daily lives. Recently, communication devices have begun to support installation of third-party applications onto the communication devices to provide new functionalities. A wide variety of third-party applications are available, and new third-party applications are developed and brought into the user community all the time. By the nature of the development and distribution model of third-party applications, the manufacturer of the mobile communication devices and/or the provider of wireless communication services may not test the execution of these third-party applications in the environment provided by the mobile communication device hardware, firmware, and/or software originally delivered. A third-party application may have undetected bugs and/or may interact in an undesirable manner with the mobile communication device as originally delivered. The behavior of third-party applications and their impact on the user experience may have implications for user satisfaction with the mobile communication device and/or the wireless communication service.

SUMMARY

In an embodiment, a mobile communication device is disclosed. The mobile communication device comprises a radio transceiver to communicatively couple the mobile communication device to a radio access network by a wireless communication link, a memory, a processor, and a monitoring application stored in the memory. The monitoring application, when executed by the processor, is configured to determine a risk profile of a monitored application installed on the mobile communication device based on at least one of: comparison of performance of the mobile communication device before and after installation of the monitored application on the mobile communication device, comparison of permission requests of the monitored application versus a type of the monitored application, community feedback of the monitored application, an amount of time elapsed since release of the monitored application, and a risk profile of a publisher of the monitored application; and perform a first action if the risk profile of the monitored application meets or exceeds a predefined first threshold.

In another embodiment, a method of managing the risk of a monitored application installed on a mobile communication device is disclosed. The method comprises determining a risk profile of the monitored application based on at least one of: comparison of performance of the mobile communication device before and after installation of the monitored application on the mobile communication device, comparison of permission requests of the monitored application versus a type of the monitored application, community feedback of the monitored application, an amount of time elapsed since release of the monitored application, and a risk profile of a publisher of the monitored application; and performing a first action if the risk profile of the monitored application meets or exceeds a predefined first threshold.

In yet another embodiment, a method of managing the risk of monitored applications installed on mobile communication devices in a telecommunications network is disclosed. The method comprises determining what applications are running on each of the mobile communication devices upon each of the mobile communication devices experiencing decreased performance; determining a set of monitored applications common to each of the mobile communication devices experiencing decreased performance; identifying a risk profile associated with each of the set of monitored applications; and performing, based on the risk profile associated with each of the set of monitored applications, an action on each of the mobile communication devices.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Problems may be caused by mobile communication devices that interfere with the proper operation of wireless access networks. One such problem may be a degraded ability for the mobile communication devices to place voice or data calls. The problems may result from software bugs in the mobile communication devices. For example, third-party applications that users purchase from online stores and install on mobile communication devices may not be properly tested and may exhibit such interfering behavior. Because wireless communication service providers do not have much control over such third-party applications, there is little the service provider can do to assure the reliability of such third-party applications. The present disclosure teaches systems and methods for determining risk profiles of such third-party applications and performing actions in response to those applications deemed risky.

For example, a risk profile of a monitored application may be determined based on multiple criteria. The criteria may include comparison of mobile communication device performance before and after installation of the monitored application, analysis of the monitored application's permission requests, community feedback associated with the monitored application, an amount of time elapsed since release of the monitored application, and a risk profile of the monitored application publisher. Based on those criteria, if the monitored application is deemed risky, then certain actions may be performed or limited. For instance, network access and functionality of the mobile device may be limited.

As another example, when a plurality of mobile communication devices in a telecommunications network experience decreased performance, it may be determined what applications are running on the mobile communication devices and what monitored applications are common to the mobile communication devices. A risk profile for each monitored application may be identified, and, based on those risk profiles, certain actions may be performed or limited. For instance, network access and functionality of mobile devices that have installed one or more of those applications may be limited.

Figure 1:
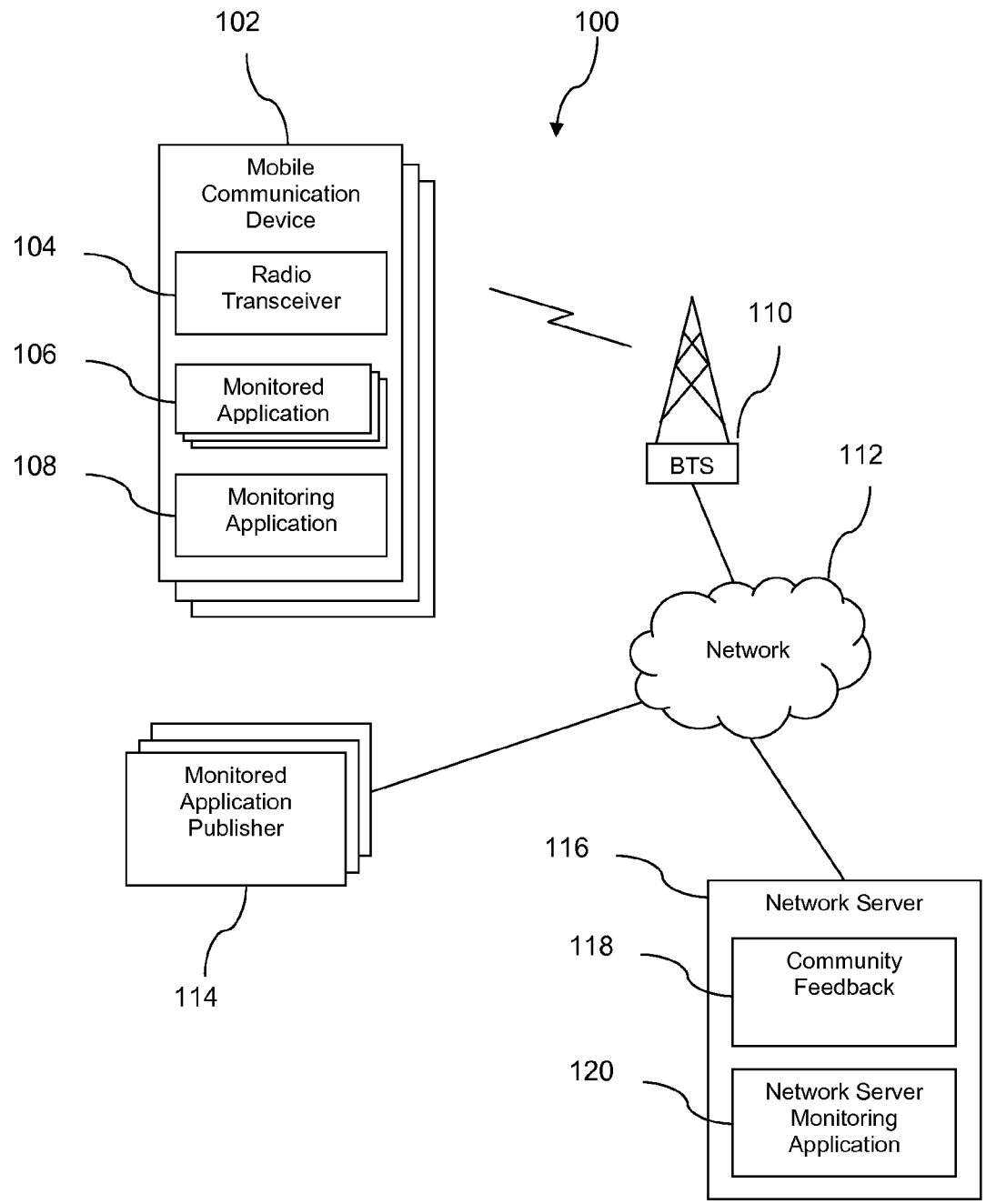
FIG. 1 is an illustration of a communication system according to an embodiment of the disclosure.

Turning now to FIG. 1, a communication system 100 is shown. The communication system 100 may comprise a plurality of mobile communication devices 102. The mobile communication device 102 may comprise a radio transceiver 104, a plurality of monitored applications 106, and a monitoring application 108. The mobile communication device 102 is configured to use the radio transceiver 104 to establish a wireless communication link with a base transceiver station (BTS) 110, and the base transceiver station 110 provides communications connectivity of the mobile communication device 102 to a network 112. The network 112 may comprise any combination of private and public networks.

It is understood that the communication system 100 may comprise any number of mobile communication devices 102 and any number of base transceiver stations 110. The collectivity of base transceiver stations 110 may be said to comprise a radio access network in that these base transceiver stations 110 may provide radio communication links to the mobile communication devices 102 to provide access to the network 112. The radio access network may be abstracted in different ways and may comprise, in addition to the base transceiver stations 110, servers and data stores such as home location registers (HLRs) or servers that implement the functionality of home location registers, visitor location registers (VLRs) or servers that implement the functionality of visitor location registers, base station controllers (BSCs), mobile switching centers (MSCs), and other network nodes that are specifically associated with providing wireless access and connectivity to the mobile communication devices 102.

The radio transceiver 104 may communicate with the base transceiver station 110 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. The mobile communication device 102 may be any of a mobile phone, a personal digital assistant (PDA), a media player, a wireless enabled computer, or other mobile communication device. In an embodiment, the mobile communication device 102 may have other components (not shown) such as a near field communication (NFC) radio transceiver, a wireless local area network (WLAN) radio transceiver, or other components.

The monitored applications 106 may comprise one or more of a voice communication application, a data communication application, a web browser application, an email application, a short message system (SMS) or texting application, a multimedia message system (MMS) application, a gaming application, a social networking application, an informational application, a functional application, a performance enhancing application, or another application. It is understood that, in an embodiment, some applications providing the functionality described above may not be monitored, as for example when the subject application or applications were installed by the original equipment manufacturer or by the wireless service provider. At the same time, users may install other applications that provide a similar function as provided by the original equipment manufacturer or wireless service provider, such as an alternate web browser, that may be monitored. The monitored application 106 may be a standard application that is delivered by an original equipment manufacturer (OEM) that assembles the mobile communication device 102. The monitored application 106 may also be a third-party application that is downloaded from a monitored application publisher 114 through the network 112 and installed on the mobile communication device 102 by a user, for example, after the mobile communication device 102 is sold to the user. The monitored application 106 may be stored as firmware or software in a memory area of the mobile communication device 102.

The monitored application publisher 114 may not be subject to design and/or quality control standards defined by a wireless service provider. A third-party application may be a freeware application and may be of dubious integrity or reliability. As such, the monitored application 106 may have the potential to interfere with the normal operation of the radio access network, for example, by interfering with the mobile communication device 102 establishing a wireless link with the base transceiver station 110. The monitored application 106 may interfere with normal operations of the radio access network by accident, for example, as a result of poor design or coding errors. For example, the monitored application 106 may capture data from the mobile communication device 102 and repeatedly send data updates to a server computer associated with the monitored application 106 over the radio access network during peak load times, thereby presenting an unnecessary burden on the network, possibly degrading the service experienced by other subscribers attempting to access the radio access network. The monitored application 106 may interfere with normal operations also by malicious intent, for example, as a result of a malware incorporated in the monitored application 106. Similarly, the monitored application 106 may also interfere solely with normal operations of the mobile communication device 102, which may result in diminished customer satisfaction and customer animus towards the wireless service provider.

In an embodiment, the mobile communication device 102 may comprise a monitoring application 108. The monitoring application 108 may be a standard application that is delivered by the original equipment manufacturer at the time of the mobile communication device's 102 manufacture or subsequently delivered by a wireless service provider or other entity to enhance the performance and security of the mobile communication device 102 and the remaining radio access network. The monitoring application 108 may determine a risk profile of all or a subset of the monitored applications 106 based on various criteria.

A first criterion may be based on a comparison of the performance of the mobile communication device 102 before and after installation of the monitored application 106 on the mobile communication device 102. The monitoring application 108 may measure performance by determining at least one of a speed of operation of an operating system of the mobile communication device 102, a presence of errors in the operating system, and locking up of the operating system. If the monitored application 106 is poorly coded or contains malware, then it may consume extensive resources of the operating system and thus slow down the operating system or other applications, possibly causing the operating system or the mobile communication device 102 to lock up. Locking up may also be referred to as freezing up and may mean that the operating system or the mobile communication device 102 ceases to respond to user inputs. In an embodiment, the monitoring application 108 may be incorporated into or embedded into the operating system. If the monitoring application 108 determines that the mobile communication device 102 performs poorer after installation of the monitored application 106, then the monitoring application 108 may determine that the monitored application 106 is risky. If the mobile communication device 102 performs the same or better, then the monitoring application 108 may determine that the monitored application 106 is not risky.

A second criterion may be based on a comparison of permission requests of the monitored application 106 versus a type of the monitored application 106. The permission requests may be, for example, requests by the monitored application 106 to access the network 112 or to access email, a contacts list, text, web browser, camera, and other applications. The type of the monitored application 106 may be defined as one of voice communication, data communication, web browsing, email, short message system, texting, multimedia message system, gaming, social networking, informational, functional, or performance enhancing. As a first example, the monitoring application 108 may determine that the monitored application 106 is a social networking application. If the social networking application requests access only to the network at appropriate times and occasionally requests access to a web browser application and a camera application, then the monitoring application 108 may determine that the social networking application's behavior is not risky as that behavior may be deemed typical for a social networking application. If, however, the social networking application frequently requests access to email and texting applications, then the monitoring application 108 may determine that the social networking application's behavior is risky as that behavior may be deemed atypical for a social networking application. As a second example, the monitoring application 108 may determine that a gaming application is not risky if it requests access only to the network, but is risky if it requests access to any other applications or to a contacts list. As a third example, the monitoring application 108 may determine that any monitored application 106 is risky if it requests access to secured servers or networks unassociated with the monitored application 106. For instance, if a monitored application 106 requests access to a secure server such as a server associated with the user's work email and unassociated with the monitored application 106, then the monitoring application 108 may determine that the monitored application 106 is risky.

A third criterion may be based on community feedback 118 of the monitored application 106. The community feedback 118 may be stored on a network server 116, which the monitoring application 108 may access through the network 112. The community feedback 118 may be publicly available, for instance, on an Internet webpage. The community feedback 118 may be provided by other users who have downloaded and used the monitored application 106. The community feedback 118 may be in the form of a score ranging from one to five with one being poor and five being excellent. Other numbering conventions, other scale ranges, or other suitable metrics such as stars, thumbs up, or thumbs down may be used. If the community feedback 118 for the monitored application 106 is unfavorable, then the monitoring application 108 may determine that the monitored application 106 is risky. If the community feedback 118 for the monitored application 106 is neutral or favorable, then the monitoring application 108 may determine that the monitored application 106 is not risky. The community feedback 118 may be an average of all risk scores associated with the subject monitored application 106 and provided by a plurality of the mobile communication devices 102 to the network server 116. The community feedback 118 may be an average of risk scores provided by a selected number of the mobile communication devices 102.

A fourth criterion may be based on an amount of time elapsed since release of the monitored application 106. The monitoring application 108 may determine that the monitored application 106 is risky if the monitored application 106 was just released. As time elapses and the monitored application 106 remains available, however, the monitoring application 108 may at some point determine that the monitored application 106 is not risky.

A fifth criterion may be based on a risk profile of the monitored application publisher 114. The monitoring application 108 may determine the risk profile of the monitored application publisher 114 based on various criteria in a manner similar to the way that the monitoring application 108 determines the risk profile of the monitored application 106. For instance, the monitoring application 108 may determine the risk profile of the monitored application publisher 114 based on community feedback 118 of the monitored application publisher 114 and an elapsed time since the monitored application publisher 114 first published an application. In an embodiment, the monitoring application 108 and/or the network server monitoring application 120 discussed below may provide the risk profile of the monitored application 106, the risk profile of the monitored application publisher 114, the community feedback 118 associated with the monitored application 106 to the application publisher, for example in the hope and expectation that the application publisher may improve their processes and/or published applications, thereby lowering their risk profile and/or the risk profile of their published application. The community feedback 118 that is provided to the monitored application publisher 114 may be an abstracted or summarized form of the community feedback 118.

The monitoring application 108 may consider other criteria to determine the risk profile of the monitored application 106 and the monitored application publisher 114. For instance, the network server monitoring application 120 may further determine risk based on the type, software build, and configuration of each mobile communication device 102 associated with the monitored applications 106 in the third set and may further determine by monitoring negative interaction with co-installed applications. The risk profiles may be binary, meaning that the monitored application 106 and the monitored application publisher 114 may be deemed either risky or not risky, or the risk profiles may be a score indicating differing levels of risk. Each individual criterion may also be a score. The monitoring application 108 may consider all of the criteria or a subset of the criteria. The user, the wireless service provider, or another entity may determine which criteria to consider. The monitoring application 108 may give increased consideration to the risk profiles as the amount of community feedback 118 for the monitored application 106 or the monitored application publisher 114 increases. The monitoring application 108 may associate different weights to each criterion. For example, the monitoring application 108 may allocate increased weight to the community feedback 118 when a greater number of community feedback reports associated with the monitored application 106 have been collected by the network server 116 and a lesser weight to the community feedback 118 when a lesser number of community feedback reports associated with the subject monitored application 106 have been collected by the network server 116.

If the risk profile of the monitored application 106 meets or exceeds a threshold, then the monitoring application 108 may perform a first action. The first action may be limiting network access of the mobile communication device 102. For instance, the monitoring application 108 may limit an amount of data use. The data may be related to data exchanged with a webpage. The first action may be limiting functionality of the monitored application 106. For instance, the monitoring application 108 may limit the monitored application's 106 access to an address book application. Alternatively, the monitoring application 108 may completely disable all functionality of the monitored application 106. The first action may be limiting other functionality of the mobile communication device 102. For instance, the monitoring application 108 may temporarily prevent alteration or creation of files in certain directories of the operating system. The first action may be providing alerts on the operating system of the mobile communication device 102. For instance, the monitoring application 108 may provide pop-ups on the mobile communication device 102 screen that indicate to the user that the monitored application 106 may be causing issues with the performance of the mobile communication device 102. The first action may be lowering at least one additional threshold that triggers additional actions. Finally, the first action may be recommending to the user at least one security product or service. The monitoring application 108 may perform other actions as well.

The monitoring application 108 may provide to the monitored application publisher 114 the risk profiles and the community feedback 118 of the monitored application 106 and the monitored application publisher 114. The monitoring application 108 may provide that information to the monitored application publisher 114 directly, through the community feedback 118, or in another suitable manner. The monitoring application 108 may determine additional risk profiles for each of a plurality of monitored applications 106 and perform additional actions in response to each of those additional risk profiles.

In another embodiment, the communication system 100 may include a plurality of mobile communication devices 102. A network server monitoring application 120 may execute on the network server 116 and operate in a manner similar to the monitoring application 108 described in the previous embodiment. The network server monitoring application 120 may, however, monitor all mobile communication devices 102 on the radio access network and therefore assess application risk on a broader scale. The network server monitoring application 120 may also execute on devices other than the network server 116. The network server monitoring application 120 may determine risk by determining what applications are running on each of the mobile communication devices 102 experiencing decreased performance. The network server monitoring application 120 may measure performance by determining at least one of a speed of operation of the operating systems of the mobile communication devices 102, a presence of errors in the operating systems, and locking up of the operating systems. The network server monitoring application 120 may consider other criteria as well.

The network server monitoring application 120 may then determine a first set of monitored applications 106 common to each of the mobile communication devices 102 experiencing decreased performance. The network server monitoring application 120 may also determine a second set of monitored applications 106 common to each of the remaining mobile communication devices 102 not experiencing decreased performance. The network server monitoring application 120 may then compare the first set and the second set to determine a third set of monitored applications 106 that may be associated with the decreased performance. For instance, the network server monitoring application 120 may perform an iterative statistical analysis to determine the third set. The network server monitoring application 120 may assign greater risk weighting to the monitored applications 106 in the third set as the statistical analysis achieves a higher probability of accuracy.

The network server monitoring application 120 may then identify a risk profile associated with each of the third set of monitored applications 106. The network server monitoring application 120 may identify the risk profiles in a manner similar to the manner described above. Specifically, the network server monitoring application 120 may determine risk based on a comparison of permission requests of the monitored applications 106 versus a type of the monitored applications 106, community feedback 118 of the monitored applications 106, an amount of time elapsed since release of the monitored applications 106, and a risk profile of publishers of the monitored applications 106. The network server monitoring application 120 may determine the risk profile of the monitored application publishers 114 based on community feedback 118 of the monitored application publishers 114 and an elapsed time since the monitored application publishers 114 first published an application.

Similar to the above embodiment, the network server monitoring application 120 may consider other criteria. For instance, the network server monitoring application 120 may further determine risk based on the type, software build, and configuration of each mobile communication device 102 associated with the monitored applications 106 in the third set and may further determine by monitoring negative interaction with co-installed applications. The risk profiles may be binary or the risk profiles may be a score. Each individual criterion may also be a score. The network server monitoring application 120 may consider all of the criteria or a subset of the criteria. The user, wireless service provider, or other entity may determine which criteria to consider. The network server monitoring application 120 may give increased consideration to the risk profiles as the amount of community feedback 118 for the monitored applications 106 or the monitored application publishers 114 increases. The network server monitoring application 120 may associate different weights to the criteria and may consider other criteria as well.

If the risk profiles of the monitored applications 106 meet or exceed a threshold, then the network server monitoring application 120 may perform a first action. The first action may be limiting network access of the mobile communication devices 102, limiting functionality of the monitored applications 106, limiting other functionality of the mobile communication devices 102, providing alerts on the operating system of the mobile communication devices 102, lowering at least one additional threshold that triggers additional actions, or recommending to the users at least one security product or service. Alternatively, the network server monitoring application 120 may completely disable all functionality of the monitored applications 106. The network server monitoring application 120 may perform other actions as well.

The network server monitoring application 120 may provide to the monitored application publishers 114 the risk profiles and the community feedback 118 of the monitored applications 106 and the monitored application publishers 114.

Figure 2:
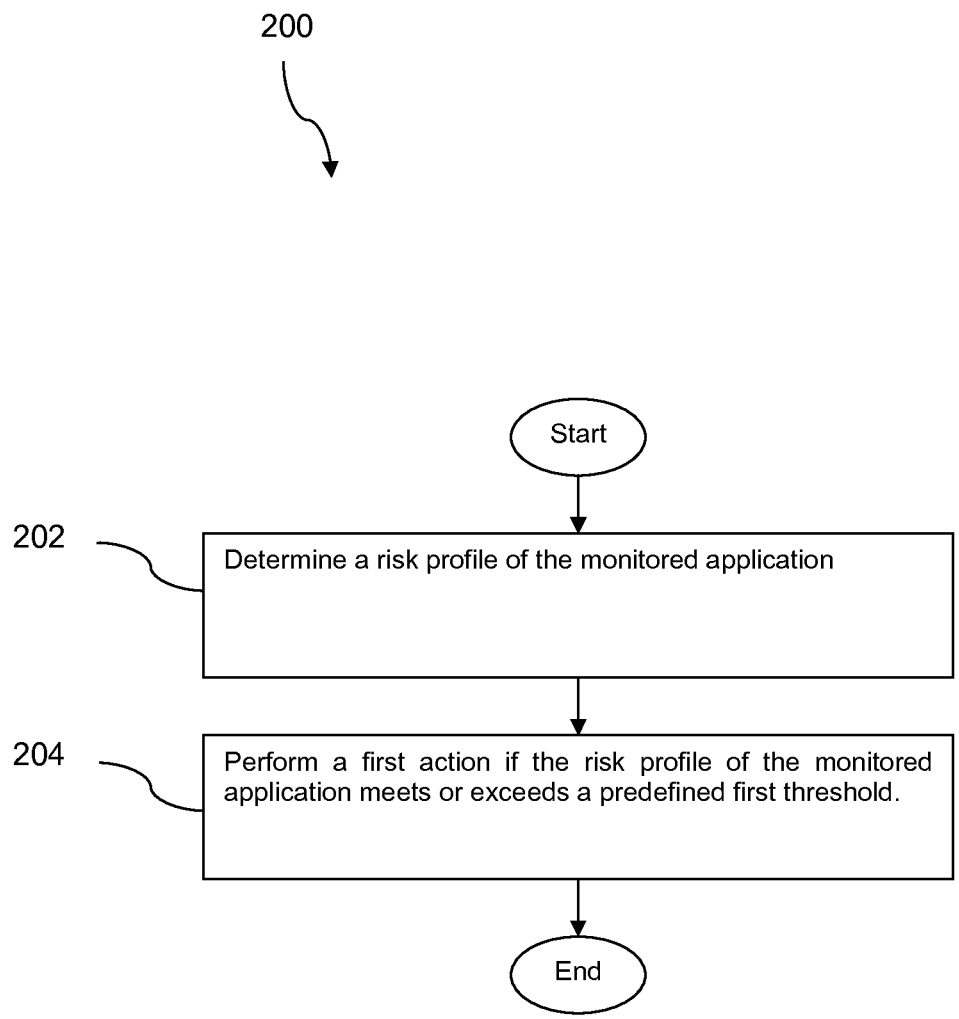
FIG. 2 is a flowchart illustrating a method of managing the risk of a monitored application installed on a mobile communication device according to an embodiment of the disclosure.

Turning now to FIG. 2, a method 200 of managing the risk of a monitored application installed on a mobile communication device is shown. At block 202, a risk profile of a monitored application is determined. For example, the monitoring application 108 may determine the risk profile of the monitored application 106 based on comparison of performance of the mobile communication device 102 before and after installation of the monitored application 106, comparison of permission requests of the monitored application 106 versus a type of the monitored application 106, community feedback 118 of the monitored application 106, an amount of time elapsed since release of the monitored application 106, and a risk profile of the monitored application publisher 114.

At block 204, a first action is performed if the risk profile of the monitored application meets or exceeds a predefined first threshold. For example, the monitoring application 108 may limit network access of the mobile communication device 102, limit functionality of the monitored application 106, limit other functionality of the mobile communication device 102, provide alerts on the operating system of the mobile communication device 102, lower at least one additional threshold that triggers additional actions, or recommend to the user at least one security product or service. By limiting network access, it is meant that the monitoring application 108 may restrict the number of times the monitored application 106 may connect to the radio access network during a unit time period, limit the volume of data transmitted or received by the monitored application 106 during a unit time period, and/or restrict the addresses that the monitored application may communicate to. By limiting functionality of the monitored application 106, it is meant that the monitored application 106 may be limited to invoking a circumscribed set of functionalities provided by the operating system and/or by other applications executing on the mobile communication device 102.

Figure 3:
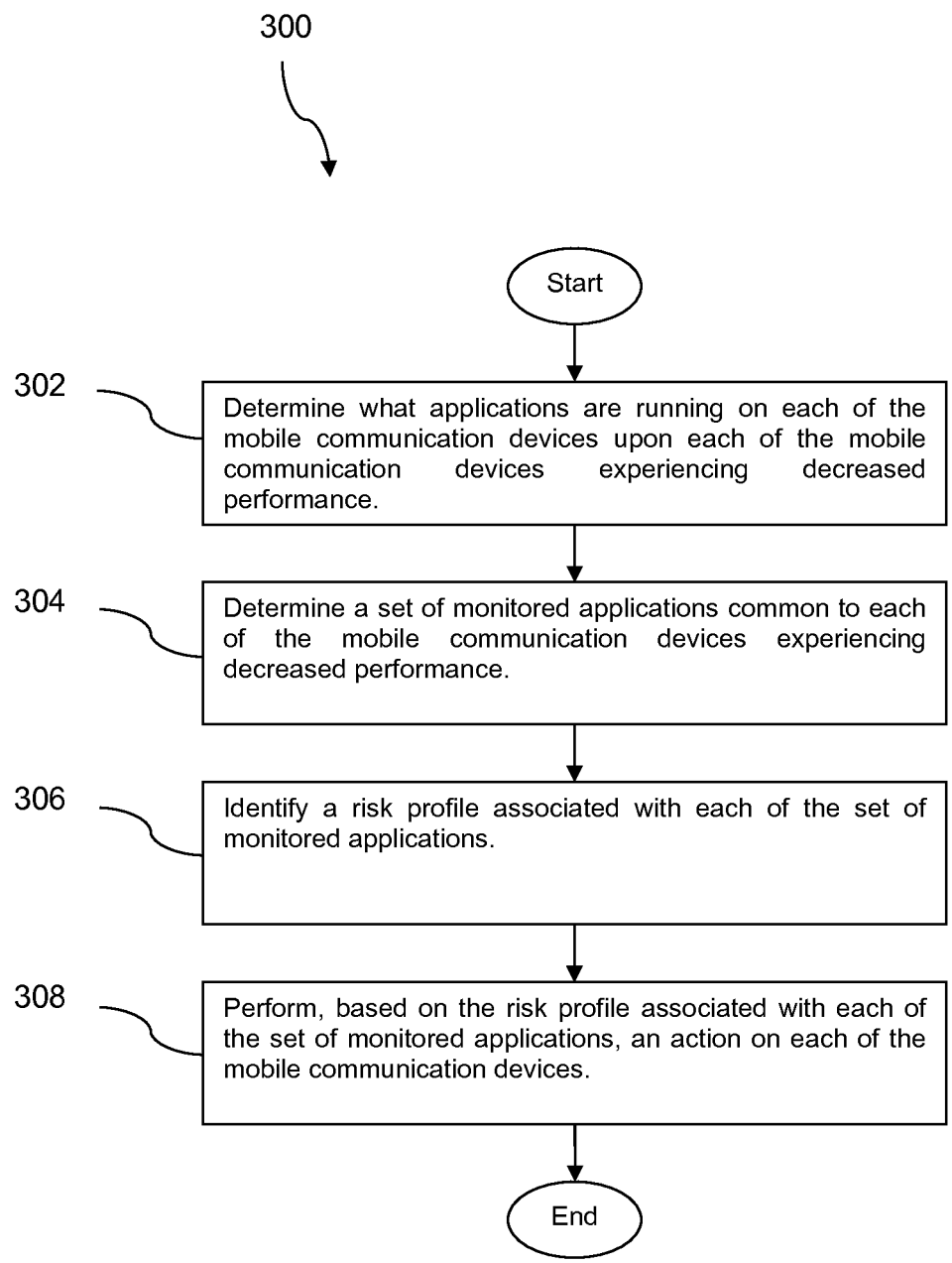
FIG. 3 is a flowchart illustrating a method of managing the risk of monitored applications installed on mobile communication devices in a telecommunications network according to an embodiment of the disclosure.

Turning now to FIG. 3, a method 300 of managing the risk of monitored applications installed on mobile communication devices in a telecommunications network is shown. At block 302, what applications are running on each of the mobile communication devices experiencing decreased performance is determined. For example, the network server monitoring application 120 may determine what applications are running on each of the mobile communication devices 102 experiencing decreased performance. The network server monitoring application 120 may measure performance by determining at least one of a speed of operation of the operating systems of the mobile communication devices 102, a presence of errors in the operating systems, and locking up of the operating systems.

At block 304, a set of monitored applications common to each of the mobile communication devices experiencing decreased performance is determined. For example, the network server monitoring application 120 may determine which monitored applications 106 are common to each of the mobile communication devices 102 experiencing decreased performance.

At block 306, a risk profile associated with each of the set of monitored applications is identified. For example, the network server monitoring application 120 may identify a risk profile associated with each of the set of monitored applications 106 based on a comparison of permission requests of the monitored applications 106 versus a type of the monitored applications 106, community feedback 118 of the monitored applications 106, an amount of time elapsed since release of the monitored applications 106, and a risk profile of publishers of the monitored applications 106.

At block 308, based on the risk profile associated with each of the set of monitored applications, an action on each of the mobile communication devices is performed. For example, the network server monitoring application 120 may limit network access of the mobile communication devices 102, limit functionality of the monitored applications 106, limit other functionality of the mobile communication devices 102, provide alerts on the operating system of the mobile communication devices 102, lower at least one additional threshold that triggers additional actions, or recommend to the users at least one security product or service.

Figure 4:
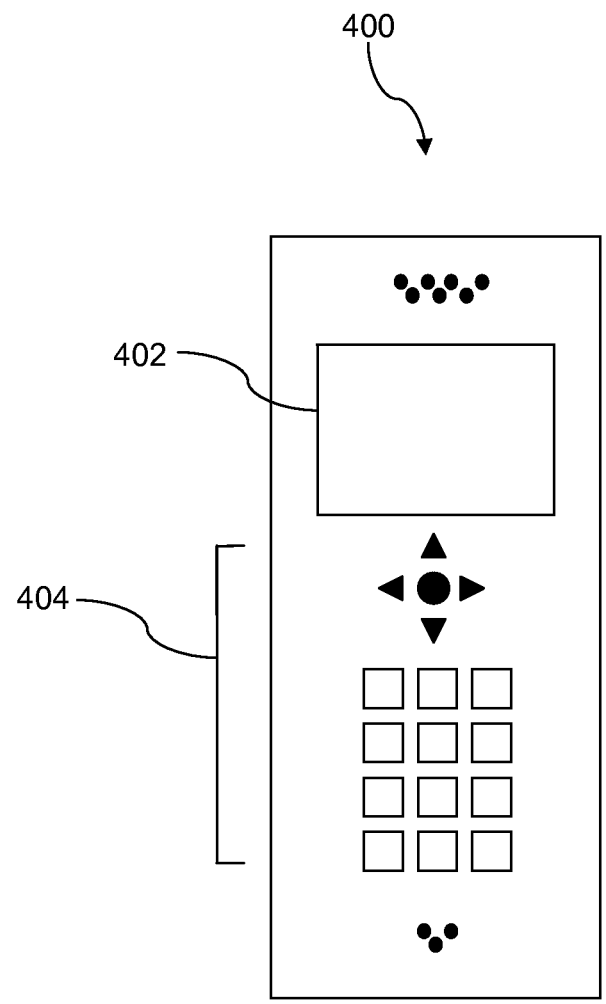
FIG. 4 is an illustration of a mobile communication device according to an embodiment of the disclosure.

Turning now to FIG. 4, a wireless communications system including the mobile device 400 is shown. FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
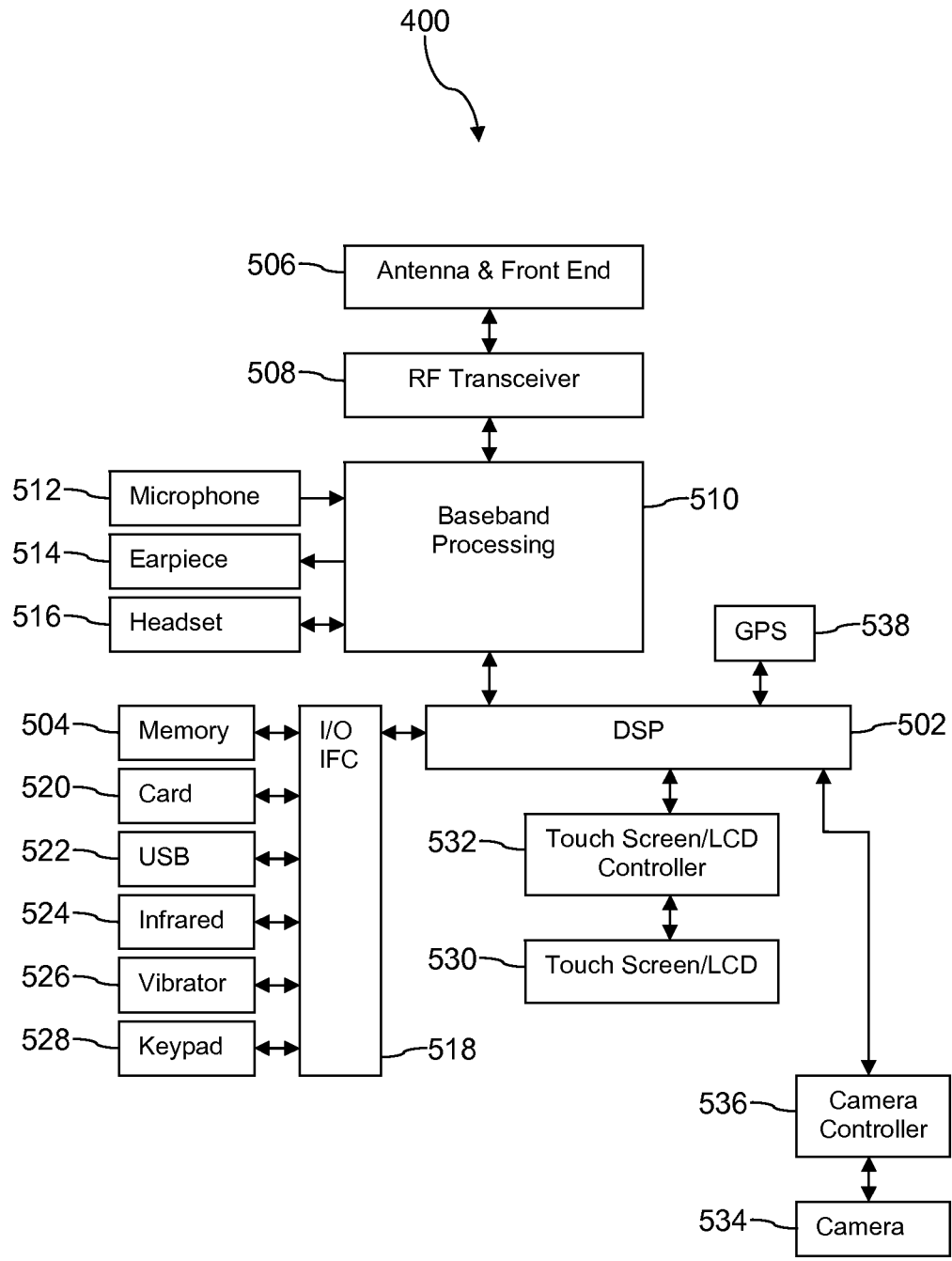
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
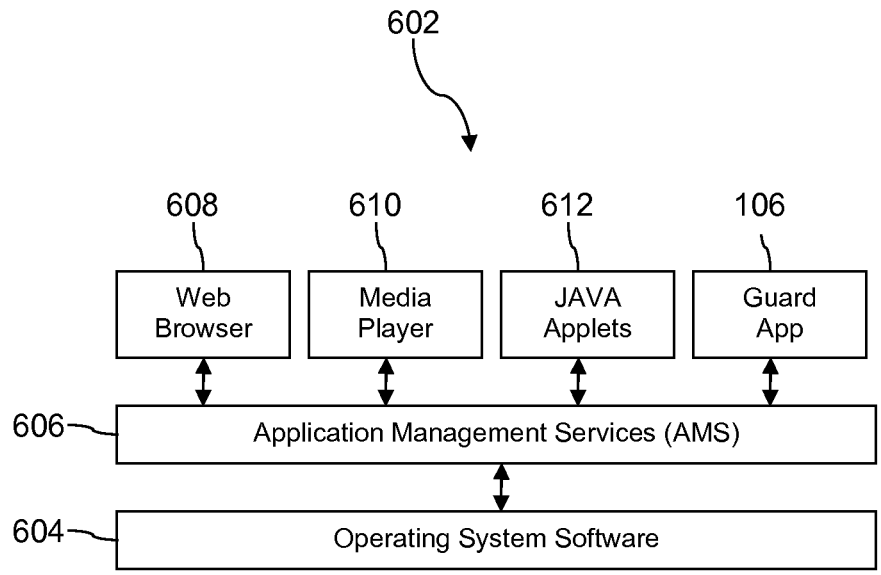
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
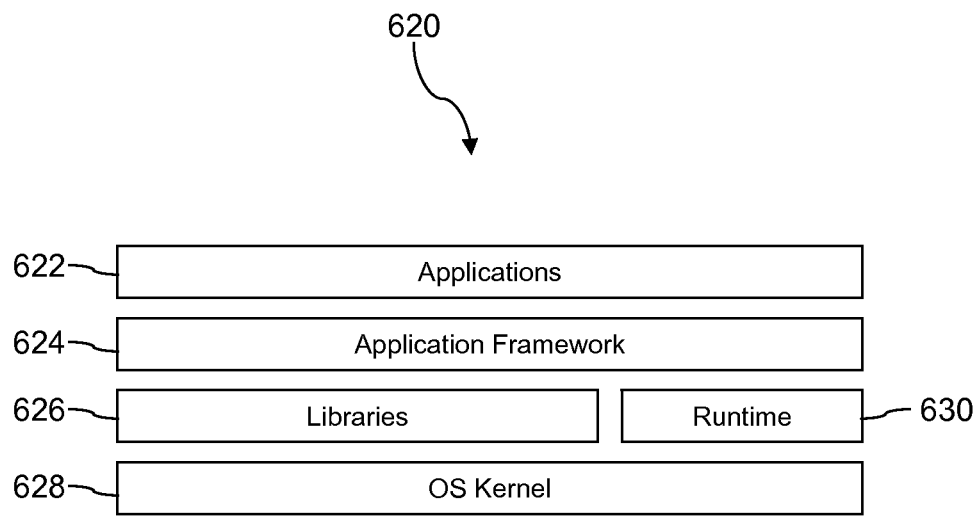
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
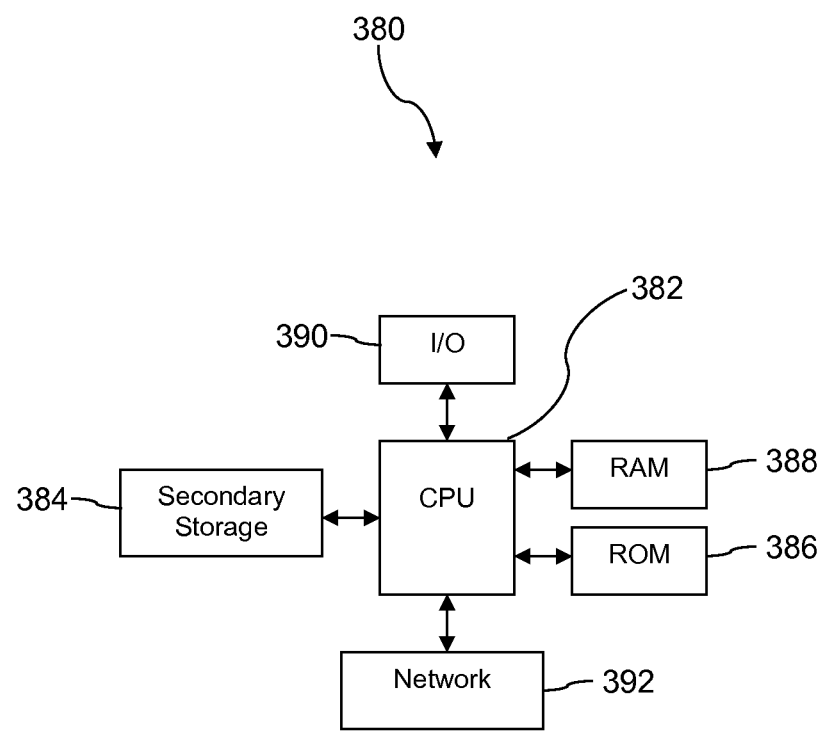
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device, comprising:
a radio transceiver to communicatively couple the mobile communication device to a radio access network by a wireless communication link;
a non-transitory memory;
a processor; and
a monitoring application stored in the non-transitory memory that, when executed by the processor, is configured to
determine a risk profile of a monitored application installed on the mobile communication device based on:
a comparison of performance of the mobile communication device before and after installation of the monitored application on the mobile communication device,
a comparison of requests by the monitored application to access a network associated with the mobile communication device or an application stored on or accessed by the mobile communication device versus requests for access by applications of a same application type as the monitored application, wherein the same application type comprises one of voice communication, data communication, web browsing, email, short message system, texting, multimedia message system, gaming, social networking, informational enhancing, functional enhancing, and performance enhancing, and
and at least one of:
community feedback of the monitored application,
an amount of time elapsed since release of the monitored application, or
a risk profile of a publisher of the monitored application; and
perform an action responsive to the risk profile of the monitored application meeting or exceeding a predefined threshold.

2. The mobile communication device of claim 1, wherein the monitoring application is further configured to:
determine risk profiles of additional monitored applications installed on the mobile communication device based on at least one of:
a comparison of performance of the mobile communication device before and after installation of each of the additional monitored applications on the mobile communication device,
a comparison of requests by each of the additional monitored applications to access one or more networks associated with the mobile communication device or one or more applications stored on or accessed by the mobile communication device versus requests for access by applications of a same application type as each of the additional monitored applications,
community feedback of each of the additional monitored applications,
an amount of time elapsed since release of each of the additional monitored applications, or
a risk profile of a publisher of each of the additional monitored applications; and
perform a second action responsive to a predefined number of the additional monitored applications meeting or exceeding a predefined second threshold.

3. The mobile communication device of claim 1, wherein the monitoring application is further configured to provide to the publisher of the monitored application at least one of:
the risk profile of the monitored application,
the community feedback of the monitored application, or
the risk profile of the publisher of the monitored application.

4. The mobile communication device of claim 1, wherein performance of the mobile communication device is based on at least one of:
speed of operation of an operating system of the mobile communication device,
a presence of errors in the operating system, or
locking up of the operating system.

5. The mobile communication device of claim 1, wherein the risk profile of the publisher of the monitored application is based on at least one of:
community feedback of the publisher of the monitored application, or
an amount of time elapsed since the publisher of the monitored application first published an application.

6. The mobile communication device of claim 1, wherein the risk profile of the monitored application is a score.

7. The mobile communication device of claim 6, wherein the score is given increased consideration as an amount of the community feedback increases.

8. The mobile communication device of claim 1, wherein the action comprises at least one of:
limiting network access of the mobile communication device,
limiting functionality of the monitored application,
limiting other functionality of the mobile communication device,
providing alerts on an operating system of the mobile communication device,
lowering at least one additional threshold that triggers additional actions, or
recommending to a user of the mobile communication device at least one security product or service.

9. A method of managing the risk of a monitored application installed on a mobile communication device, the method comprising:
determining a risk profile of the monitored application based on:

a comparison of requests by the monitored application to access a network associated with the mobile communication device or an application stored on or accessed by the mobile communication device versus requests for access by applications of a same application type as the monitored application, wherein the same application type comprises one of voice communication, data communication, web browsing, email, short message system, texting, multimedia message system, gaming, social networking, informational enhancing, functional enhancing, and performance enhancing, a comparison of performance of the mobile communication device before and after installation of the monitored application on the mobile communication device, and at least one of:
community feedback of the monitored application,
an amount of time elapsed since release of the monitored application, or
a risk profile of a publisher of the monitored application; and performing an action responsive to the risk profile of the monitored application meeting or exceeding a predefined threshold.

10. The method of claim 9, further comprising:
determining risk profiles of additional monitored applications installed on the mobile communication device based on at least one of:
a comparison of performance of the mobile communication device before and after installation of each of the additional monitored applications on the mobile communication device,
a comparison of requests by each of the additional monitored applications to access one or more networks associated with the mobile communication device or one or more applications stored on or accessed by the mobile communication device versus requests for access by applications of a same application type as the monitored application,
community feedback of each of the additional monitored applications,
an amount of time elapsed since release of each of the additional monitored applications, or
a risk profile of a publisher of each of the additional monitored applications; and
performing a second action responsive to a predefined number of the additional monitored applications meeting or exceeding a predefined second threshold.

11. The method of claim 9, further comprising providing to the publisher of the monitored application at least one of:
the risk profile of the monitored application,
the community feedback of the monitored application, or
the risk profile of the publisher of the monitored application.

12. The method of claim 9, wherein performance of the mobile communication device is based on at least one of:
speed of operation of an operating system of the mobile communication device,
a presence of errors in the operating system, or
locking up of the operating system.

13. The method of claim 9, wherein the risk profile of the publisher of the monitored application is based on at least one of:
community feedback of the publisher of the monitored application, or
an amount of time elapsed since the publisher of the monitored application first published an application.

14. The method of claim 9, wherein the risk profile of the monitored application is a score.

15. The method of claim 14, wherein the score is given increased consideration as an amount of the community feedback increases.

16. The method of claim 9, wherein the action comprises at least one of:
limiting network access of the mobile communication device,
limiting functionality of the monitored application,
limiting other functionality of the mobile communication device,
providing alerts on an operating system of the mobile communication device,
lowering at least one additional threshold that triggers additional actions, or
recommending to a user of the mobile communication device at least one security product or service.

* * * * *